United States Patent [19]

Constien

[11] Patent Number: 5,582,250
[45] Date of Patent: Dec. 10, 1996

[54] OVERBALANCED PERFORATING AND FRACTURING PROCESS USING LOW-DENSITY, NEUTRALLY BUOYANT PROPPANT

[75] Inventor: Vernon G. Constien, Sperry, Okla.

[73] Assignee: Dowell, a division of Schlumberger Technology Corporation, Sugar Land, Tex.

[21] Appl. No.: 556,152

[22] Filed: Nov. 9, 1995

[51] Int. Cl.$^6$ ..................................................... E21B 43/46
[52] U.S. Cl. .......................... 166/280; 166/308; 507/924
[58] Field of Search .................................... 166/280, 297, 166/299, 308; 507/924

[56] References Cited

U.S. PATENT DOCUMENTS

| | | | |
|---|---|---|---|
| 4,733,729 | 3/1988 | Copeland | 166/276 |
| 4,850,430 | 7/1989 | Copeland et al. | 166/276 |
| 4,969,523 | 11/1990 | Martin et al. | 166/278 |
| 5,103,911 | 4/1992 | Heijnen | 166/297 |
| 5,131,472 | 7/1992 | Dees et al. | 166/308 |
| 5,271,465 | 12/1993 | Schmidt et al. | 166/297 |
| 5,373,899 | 12/1994 | Dore et al. | 166/297 X |
| 5,400,856 | 3/1995 | Schmidt | 166/297 X |
| 5,429,191 | 7/1995 | Schmidt et al. | 166/297 |
| 5,531,274 | 7/1996 | Bienvenu, Jr. | 166/280 |

*Primary Examiner*—George A. Suchfield
*Attorney, Agent, or Firm*—John E. Vick, Jr.

[57] ABSTRACT

The present process permits the use of more efficient, low viscosity fluids to efficiently perforate and fracture a subterranean formation in an overbalanced condition in the wellbore. In accordance with the invention, a method of decreasing the resistance to fluid flow in a subterranean formation around a well having a non-perforated casing fixed therein, the casing extending at least partially through the formation, comprises:

(a) providing a low viscosity liquid having a density of less than about 2 grams per cubic centimeter in the casing opposite the formation to be treated;

(b) providing a particulate proppant having a density matched with the low viscosity liquid suspended in the low viscosity liquid which has substantially neutral buoyancy in the liquid;

(c) placing perforating means in the casing at a depth opposite the formation to be treated;

(d) applying pressure to the liquid opposite the formation to be treated to a pressure at least as large as a fracturing pressure required to fracture the formation when liquid pressure is applied to the formation, and (e) activating the perforating means.

Optionally, at a time before pressure in the well at the depth of the formation to be treated has substantially decreased, the method may include the further step of injecting additional fluid at an effective rate to fracture the formation.

9 Claims, No Drawings

OVERBALANCED PERFORATING AND FRACTURING PROCESS USING LOW-DENSITY, NEUTRALLY BUOYANT PROPPANT

This invention relates to the art of recovery of hydrocarbon values from a well penetrating a subterranean formation and, more particularly, to a process of overbalanced perforating which creates a fracture extending outwardly from the well.

BACKGROUND OF THE INVENTION

In the art of recovery of hydrocarbons such as oil and natural gas from subterranean formations through a wellbore penetrating the earth to the hydrocarbon-bearing formation, it is common to perform some type of stimulation procedure to the formation in order to enhance the recovery of the valuable hydrocarbons.

In order to recover the valuable fluids from a subterranean formation, a well is drilled from the surface, or in the case of a subsea well, from the sea floor, to the hydrocarbon-bearing formation. Following drilling, the well is generally completed by installing a tubular well casing in the open borehole and cementing the casing in place by forcing cement down through the casing bore to the bottom of the borehole and then upwardly in the annular space between the casing and the borehole. The casing acts to retain an open conduit between the formation and the surface against wellbore sloughing or formation particle transport which would tend to block the borehole. The cement acts to hold the casing in place in the borehole and also to provide a seal which acts to prevent migration of fluids between different subterranean zones penetrated by the borehole.

Because the casing and cement forms a continuous hollow column, no wellbore fluids are able to enter the well to be transported to and recovered at the surface. For this reason, it is common to provide openings through casing and cement annulus in the zone of interest by perforating using precisely placed, high explosive charges which, literally, blast a hole through the casing and cement and out into the surrounding formation to provide a channel from the formation into the wellbore for recovery of the desired formation fluids.

It is also common to stimulate the flow of valuable fluids to the wellbore and the perforated channels by treatment of the surrounding formation. One common stimulation treatment is hydraulic fracturing of the adjacent formation rock. In hydraulic fracturing, an hydraulic fluid typically comprising an aqueous or hydrocarbon base liquid or foam is thickened with a polymeric material and pumped through the casing and the perforations at a sufficiently high pressure to form a crack or fracture in the surrounding formation rock. High pressure pumping is then continued to extend the fracture generally radially outwardly from the wellbore. In order that the fractures which are created do not close once fracturing pressure is released, the fracturing fluid typically contains a solid particulate material, termed a proppant, which will remain in the fracture once the pressure is released to provide a low-restriction flow channel through the formation back to the wellbore.

Typical proppant materials used in hydraulic fracturing comprise sand or a synthetic ceramic-type material having a density of 2.5 g/ml or greater. Because of this relatively high density, the fracturing fluid employed in the proppant placement process must have sufficient viscosity to retain these dense proppant particles in suspension for a sufficient period of time to allow mixing and transport through surface pumping equipment and piping, through the length of the wellbore and outwardly through the full length of the formation fracture. If the proppant settles prematurely in the carrier fluid, the proppant will form a block to extension of the fracture and the further placement of proppant in the fracture. This early termination of the fracturing process may cause the overall treatment to fail short of its goal to provide a conductive channel for the recovery of formation fluids.

In an overbalanced perforating and fracturing treatment operation, the most efficient use of the explosive energy generated in the perforating operation requires that the high-pressure fluid in the wellbore which is released to fracture the formation, flow easily and quickly through the perforations to effect fracture initiation and extension away from the wellbore. Thus, the most efficient fluids for an overbalanced perforation and fracturing operation have both high shear thinning and low viscosity properties since such fluids will flow more easily and quickly. However, the characteristics of shear thinning and low viscosity are incompatible with the suspension, transport and deposition of traditional proppant materials in an overbalanced perforating and fracturing operation. Traditional sand and sintered-type proppant materials prematurely settle out of the low viscosity, shear thinning fluids which are most efficient for rapid fluid movement in a simultaneous perforating and fracturing treatment. For this reason, most current simultaneous perforating and fracturing operations are carried out without proppant being in the wellbore. This results in a less efficient treatment.

SUMMARY OF THE INVENTION

The present invention permits the use of more efficient, low viscosity fluids and proppants in overbalanced perforating to efficiently perforate, fracture and prop open a subterranean formation.

In accordance with the invention, a method of decreasing the resistance to fluid flow in a subterranean formation around a well having a non-perforated casing fixed therein, the casing extending at least partially through the formation, comprises:

(a) providing a low viscosity liquid having a density of less than about 2 grams per cubic centimeter in the casing opposite the formation to be treated;

(b) providing a particulate proppant having a density matched with the low viscosity liquid suspended in the low viscosity liquid which has substantially neutral buoyancy in the liquid;

(c) placing perforating means in the casing at a depth opposite the formation to be treated;

(d) applying pressure to the liquid opposite the formation to be treated to a pressure at least as large as a fracturing pressure required to fracture the formation when liquid pressure is applied to the formation, and (e) activating the perforating means causing the suspended slurry of proppant to flow through the perforations and prop the fracture which is created.

Further in accordance with the invention, the above process further includes the step of injecting additional fluid at an effective rate to fracture the formation at a time before pressure in the well at the depth of the formation to be treated has substantially decreased.

Further in accordance with the invention, a method of treating a subterranean formation comprises the steps of:

a. providing a wellbore including a tubular casing penetrating the subterranean formation;

b. providing means for perforating the tubular casing adjacent the subterranean formation;

c. providing a fluid having neutrally buoyant proppant material having a density of less than about 2 grams per cubic centimeter suspended therein in the wellbore;

d. applying fracturing pressure to the fluid in the wellbore while activating the perforating means, and e. continuing to apply fracturing pressure to the fluid to expel the fluid into the subterranean formation and to extend a fracture therein.

It is therefore an object of this invention to provide a method for perforating and fracturing in an overbalanced condition in a process wherein proppant is suspended in the wellbore prior to perforating and the proppant is carried into the formation with the explosive activation of the perforating guns.

DETAILED DESCRIPTION OF THE INVENTION

Overbalanced perforating processes have been described, for instance, in U.S. Pat. Nos. 5,131,472 and 5,271,465. This type of process is generally used to create near-wellbore fractures. At the time of firing the perforating charges, it is desirable to execute this process with a fluid in the wellbore which contains a particulate proppant material suspended in the fluid. This allows the creation of small fractures which are packed with proppant. These fractures remain open after the hydraulic pressure which created them is dissipated and form a conductive pathway for reservoir fluids to enter the wellbore. In accordance with the present invention, a system which comprises a low density proppant material and brine fluid is placed into the wellbore and the propping agent is suspended in the fluid until the overpressured perforating process is carried out. The ideal fluids for this process are low viscosity brines whose density is chosen such that proppant material mixed into the fluids has a low static settling velocity.

The combination of brines and low density proppant has advantages over normal fracturing fluids and conventional proppant such as sand in that low viscosity fluids can be used to suspend the proppant in the wellbore over long periods of time at high temperatures without the use of a high viscosity fluid. Conventional high viscosity fracturing fluids can degrade while in the wellbore resulting in the proppant settling and becoming immobile in the casing. Also, in an overbalanced perforating treatment, the use of high viscosity fracturing fluids can result in high friction pressures and resistance to flow because the rapid movement of fluid after the perforation guns are fired can exceed the relaxation time of the fluid containing the proppant, thus causing the fluid to exhibit solid-like properties. This can result in poor transfer of pressure to the formation rock and little or no packed fracture.

This example illustrates the process of overbalanced perforating and fracturing using a combination of brine and a low-density proppant suspended in the brine fluid. The low-density material used for the proppant in this example is substantially the same material comprising low-density ceramic spheres described as a gravel packing material in U.S. Pat. Nos. 4,733,729, 4,850,430 and 4,969,523, owned by the assignee of this invention and incorporated herein by reference.

The following conditions are assumed:

| | |
|---|---|
| Bottom-hole static temperature (BHST)- | 175° F. |
| Proppant density- | 1.68 g/cm3 |
| Proppant size- | 20/40 mesh, (0.062 cm, avg.) |

The treatment is designed such that the proppant is suspended by the brine at bottom hole static conditions.

To suspend the 1.68 g/cm3 proppant, a matched density brine is required. At 60° F., this would require a density of 1.68 g/cm3 or 14 lb/gal brine. A brine composition which meets these requirements could be formulated as follows:

0.7221 barrels water 133.99 lb. of 95% $CaCl_2$ 202.86 lb. of 95% $CaBr_2$

This brine has a crystallization temperature of 58° F. Other compositions are also possible to meet the density requirements and those skilled in the art could derive the best economic and performance balance, the above composition being presented for the purpose of illustrating the invention, only.

Because the density of brine changes with temperature, it may be necessary to formulate the brine at a higher density in order to prevent proppant settling in the wellbore as the fluid warms to the BHST. In this example, it is estimated that the brine density will decrease according to the relation:

lb/gal.@60° F.=(lb/gal@temp)+(temp-60)×(correction factor)

For the brine composition of this example, the correction factor is 0.0033. For brine to have a density of 1.68 g/cm3 at 175° F., the lb/gal at 60° F.=(14)+(175−60)×0.0033 or 14.3 lb/gal at 60° F. The formulation for this fluid thus becomes:

0.7079 barrels water 126.38 lb. of 95% $CaCl_2$ 228.21 lb. of 95% $CaBr_2$

The crystallization temperature of this brine is 60° F.

In some cases, it may be desirable to formulate a fluid system which is not density matched with the proppant. This may be accomplished by using a combination of brine plus a viscosifying agent for heavy brines such as a derivative of cellulose or a viscoelastic surfactant system. The composition may be optimized to achieve the desired stability by using an equation which combines Stokes Law for particle settling with a power law equation for prediction of fluid rheology which contains a term for zero shear viscosity. This equation is:

$$u_1 = \frac{g \Delta \rho d_p^2}{18 u_0} + \frac{g \Delta \rho d_p^2}{18K'} \frac{(u_T)^{1-n'}}{(d_p)}$$

where g is the gravity constant, $\Delta\rho$ is the density difference between the fluid and the proppant, n' is the power law behavior index and $u_0$ is the zero shear viscosity.

Viscoelastic surfactant type thickeners are described in U.S. Pat. No. 4,432,881, and identified as a superior fracturing fluid in U.S. Pat. No. 4,541,935. The thickener composition comprises a water soluble or water dispersible interpolymer having pendant hydrophobic groups chemically bonded thereto. When mixed with a water soluble or water dispersible nonionic surfactant, and a soluble electrolyte, a viscosified fluid stable to high temperature and/or shear is obtained. No problems with fish eyes or microgels are encountered, and conventional field mixing equipment can be used. The preferred interpolymers are vinyl addition polymers in which two or more vinyl monomers With ethylenic unsaturation are reacted together under polymerization conditions. Of these, polymers containing at least one of the water soluble monomers represented by Formula 1 or Formula 2 are preferred.

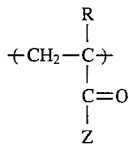
(1)

R is hydrogen or methyl and Z is —$NH_2$, —OH, —OR' where R' is a $C_1$-$C_4$ alkyl group, —NH—R"—$SO_3$M wherein R" is an alkylene group of from 1 to 24 carbon atoms (preferably $C_1$ to $C_4$ alkylene) and M is hydrogen or an ammonium or alkali metal ion.

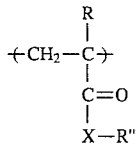
(2)

R is hydrogen or methyl, X is —O— or —NH—, and R is a hydrophobic group. R''' is preferably an aliphatic hydrophobic group such as an alkyl or alkenyl group of from 6 to about 24 carbon atoms or an inertly substituted such group, etc., and is most preferably an alkyl group of from about 8 to about 24 carbon atoms.

The interpolymers are usually solid polymers having a number average molecular weight of about one million or more.

The nonionic surfactant has a hydrophilic-lipophilic balance (HLB) of from about 10 to about 14. Such nonionic surfactants constitute a known class of compounds having many members. The preferred materials are ethoxylated alkanols having from about 8 to about 24 carbon atoms in the alkanol moiety. The preferred water soluble electrolytes are the sodium, potassium and ammonium halides.

Once the desired combination of proppant, brine and viscosifying agent are selected, the process is straight forward. The fluid is prepared by first mixing brine to the desired density and adding additional additives such as viscosifying agents, corrosion inhibitors or other special additives as indicated by the specific well conditions. The low density proppant is added either in a batch mix or continuous mix process and circulated to the position in the wellbore where the perforations are to be placed. The perforation guns are lowered into the wellbore and the desired overburden pressure is obtained by any number of means including pressurization with gas. When the perforation guns are fired, the brine containing the proppant is carried into the fractured formation. Applying additional pump pressure to the fluid can extend the fracture even further into the formation. When the hydraulic pressure bleeds away into the formation, the earth stresses close the fracture until it contacts the packed bed of proppant. This results in a highly permeable pathway for reservoir fluids to drain into the wellbore for recovery to the surface.

In general, a proppant density of less than 2.0 g/cm3 is preferred. The viscosity at zero shear rate and at temperature is preferably less than 1000 cp. A brine composition including $CaCl_2$ and $CaBr_2$ is preferred because of cost. Additionally, $ZnBr_2$ fluids may be used if the density,. economic and crystallization temperature requirements warrant its use.

While the invention has been described in the more limited aspects of preferred embodiments thereof, other embodiments have been suggested and still others will occur to those skilled in the art upon a reading and understanding of the foregoing specification. It is intended that all such embodiments be included within the scope of this invention as limited only by the appended claims.

What I claim is:

1. A method of decreasing the resistance to fluid flow in a subterranean formation around a well having a non-perforated casing fixed therein, the casing extending at least partially through the formation, comprising:

(a) providing a liquid having a density of less than about 2.0 grams per cubic centimeter in the casing opposite the formation to be treated;

(b) providing a particulate proppant in the liquid which has substantially neutral buoyancy in the liquid;

(c) placing perforating means in the casing at a depth opposite the formation to be treated;

(d) applying pressure to the liquid opposite the formation to be treated to a pressure at least as large as a fracturing pressure required to fracture the formation when liquid pressure is applied to the formation, and (e) activating the perforating means.

2. The method as set forth in claim 1 wherein the step of providing a liquid comprises providing a liquid having a density of less than about 1.7 grams per cubic centimeter.

3. The method as set forth in claim 2 wherein the step of providing a particulate proppant comprises providing ceramic spheres having a density substantially matched to the density of the liquid.

4. The method as set forth in claim 1 wherein the step of providing a liquid comprises providing a liquid selected from a group consisting of brine, hydrocarbons and an aqueous liquid including a viscosifying polymer.

5. The method as set forth in claim 4 wherein the step of providing a liquid comprises providing an aqueous brine including salts selected from a group consisting of calcium chloride, calcium bromide, zinc chloride, zinc bromide and mixtures thereof.

6. The method as set forth in claim 5 wherein the step of providing a brine includes providing a brine which includes a viscosifying polymer.

7. The method as set forth in claim 1 further including the step of (f) at a time before pressure in the well at the depth of the formation to be treated has substantially decreased, injecting fluid at an effective rate to fracture the formation.

8. A method of treating a subterranean formation comprising the steps of:

a. providing a wellbore including a tubular casing penetrating the subterranean formation;

b. providing means for perforating the tubular casing adjacent the subterranean formation;

c. providing a fluid having neutrally buoyant proppant material having a density of less than about 2.0 grams per cubic centimeter suspended therein in the wellbore;

d. applying fracturing pressure to the fluid in the wellbore while activating the perforating means, and e. continuing to apply fracturing pressure to the fluid to expel the fluid into the subterranean formation and to extend a fracture therein.

9. A method of decreasing the resistance to fluid flow in a subterranean formation around a well having a non-perforated casing fixed therein, the casing extending at least partially through the formation, comprising:

(a) providing a low viscosity liquid having a density of less than about 2.0 grams per cubic centimeter in the casing opposite the formation to be treated;

(b) providing a particulate proppant having a density matched with the low viscosity liquid suspended in the low viscosity liquid which has substantially neutral buoyancy in the liquid;

(c) placing perforating means in the casing at a depth opposite the formation to be treated;

(d) applying pressure to the liquid opposite the formation to be treated to a pressure at least as large as a fracturing pressure required to fracture the formation when liquid pressure is applied to the formation;

(e) activating the perforating means, and (f) at a time before pressure in the well at the depth of the formation to be treated has substantially decreased, injecting additional fluid and neutrally buoyant proppant at an effective rate to fracture the formation.

* * * * *